US011146104B2

(12) United States Patent
La Rosa et al.

(10) Patent No.: US 11,146,104 B2
(45) Date of Patent: Oct. 12, 2021

(54) RADIOFREQUENCY-POWERED DEVICE, CORRESPONDING SYSTEM AND METHOD

(71) Applicant: STMicroelectronics S.r.l., Agrate Brianza (IT)

(72) Inventors: Roberto La Rosa, Catania (IT); Alessandro Finocchiaro, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/862,850

(22) Filed: Apr. 30, 2020

(65) Prior Publication Data

US 2020/0350781 A1 Nov. 5, 2020

(30) Foreign Application Priority Data

May 3, 2019 (IT) .................. 102019000006511

(51) Int. Cl.
*H02J 7/02* (2016.01)
*H04W 4/02* (2018.01)
(Continued)

(52) U.S. Cl.
CPC ............ *H02J 50/001* (2020.01); *H02J 50/20* (2016.02); *H02J 50/80* (2016.02)

(58) Field of Classification Search
CPC .. H02J 50/50; H02J 50/20; H02J 50/80; H02J 50/001; G06K 19/0709
See application file for complete search history.

(56) References Cited

U.S. PATENT DOCUMENTS

2008/0055092 A1    3/2008  Burr
2011/0254379 A1*  10/2011  Madawala ............. H02J 5/005
                                                         307/104
(Continued)

FOREIGN PATENT DOCUMENTS

EP         2239688 A1    10/2010

OTHER PUBLICATIONS

Yang, Wenyu, et al.: "Wireless Firmware Execution Control in Computational RFID Systems," 2015 IEEE International Conf. on RFID, 2015 (8 pages).
(Continued)

*Primary Examiner* — Adi Amrany
*Assistant Examiner* — Esayas G Yeshaw
(74) *Attorney, Agent, or Firm* — Crowe & Dunlevy

(57) ABSTRACT

A radiofrequency-powered device such as a wireless passive sensor node, for instance, comprises a radiofrequency energy harvesting circuit configured to be coupled to an antenna to harvest radiofrequency energy captured by the antenna from a radiofrequency signal. The radiofrequency energy harvesting circuit is configured to be coupled to an energy storage component to store therein energy harvested via the radiofrequency energy harvesting circuit. The device comprises user circuitry configured to be supplied with energy harvested via the radiofrequency energy harvesting circuit and to operate in accordance with one of a plurality of configurations as a function of configuration data supplied thereto. A receiver circuit coupled to the radiofrequency energy harvesting circuit is configured to receive a configuration data signal modulating the radiofrequency signal and supply to the user circuitry configuration data extracted from the configuration data signal received.

40 Claims, 3 Drawing Sheets

(51) Int. Cl.
*H02J 50/00* (2016.01)
*H02J 50/80* (2016.01)
*H02J 50/20* (2016.01)

(56) References Cited

U.S. PATENT DOCUMENTS

| | | |
|---|---|---|
| 2011/0260839 A1 | 10/2011 | Cook et al. |
| 2014/0246917 A1* | 9/2014 | Proud ................. A61B 5/0205 307/104 |
| 2015/0224883 A1* | 8/2015 | Ichikawa ................ B60L 50/16 320/108 |
| 2016/0111887 A1* | 4/2016 | Jeong ..................... H02J 5/005 307/104 |
| 2018/0331580 A1 | 11/2018 | Larosa et al. |
| 2019/0058458 A1* | 2/2019 | Hong ........................ H03J 3/24 |
| 2019/0329653 A1* | 10/2019 | Ueta ..................... B60K 37/02 |

OTHER PUBLICATIONS

IT Search Report and Written Opinion for IT Appl. No. 102019000006511 dated Dec. 5, 2019 (8 pages).

* cited by examiner

RADIOFREQUENCY-POWERED DEVICE, CORRESPONDING SYSTEM AND METHOD

PRIORITY CLAIM

This application claims the priority benefit of Italian Application for Patent No. 102019000006511, filed on May 3, 2019, the content of which is hereby incorporated by reference in its entirety to the maximum extent allowable by law.

TECHNICAL FIELD

The description relates to harvesting radiofrequency (RF) energy.

One or more embodiments may be applied, for instance, in IoT (Internet of Things) devices.

BACKGROUND

Wireless sensor network (WSN) arrangements capable of collecting and sharing data in a wireless environment may rely on devices expected to be positioned in places that are difficult to reach and service.

This stimulates the interest for innovative solutions for wireless power transfer and energy harvesting which may facilitate implementing easy-to-maintain battery-driven (notionally battery-free) devices as well as set-and-forget sensor nodes hardly requiring maintenance (notionally maintenance-free).

It is observed that RF-powered wireless passive sensor nodes (WPSNs) may give rise to fairly complex systems. These may involve wireless power transfer as well as integration of communication systems (Bluetooth radio, for instance), data processing and sensors.

Also, WPSNs may be considered for use in a wide variety of possible applications. This results in issues related to implementing configurable devices possibly configured to be configured in a different manner with a view to different intended applications.

A first option in that respect may involve providing specialized devices configured for a certain application. This option may result in notable costs in view of the possible use of dedicated GPIO (General Purpose Input-Output) modules or OTP (One Time Programmable) circuits.

Another option may involve providing re-configurable devices. This option may involve energy losses with the possibility that a certain device should be somehow "primed" by being provided first with energy to turn on and then with additional energy to be configured.

Also, certain conventional solutions may suffer from drawbacks in terms of package, testing and miniaturization costs, possibly related to the provisions of "extra" pins.

Documents such as W. Yang, et al.: "Wireless firmware execution control in computational RFID systems", 2015 IEEE international conference on RFID, IEEE, 2015, pp. 129-136, incorporated by reference, are exemplary of conventional solutions as considered herein.

There is a need in the art to provide improved arrangements overcoming the drawbacks outlined in the foregoing.

SUMMARY

Embodiments herein concern a wireless passive sensor node (WPSN) and a wireless sensor network (WSN).

In an embodiment, a device comprises: a radiofrequency energy harvesting circuit configured to be coupled to an antenna to harvest radiofrequency energy captured by said antenna from a radiofrequency signal, the radiofrequency energy harvesting circuit configured to be coupled to an energy storage component to store therein energy harvested via the radiofrequency energy harvesting circuit; user circuitry configured to be supplied with energy harvested via the radiofrequency energy harvesting circuit and to operate in accordance with one of a plurality of configurations as a function of configuration data supplied thereto; and a receiver circuit coupled to said radiofrequency energy harvesting circuit and configured to receive a configuration data signal modulating said radiofrequency signal and supply to the user circuitry configuration data extracted from the configuration data signal received.

In an embodiment, the radiofrequency energy harvesting circuit is activated and the receiver circuit is activated. The user circuitry is configured to operate in accordance with one of a plurality of configurations as a function of configuration data supplied thereto.

In an embodiment, a device comprises: a radiofrequency energy harvesting circuit configured to harvest radiofrequency energy from a radiofrequency signal and store the harvested energy in an energy storage component; user circuitry configured to be supplied with energy from said energy storage component and to operate in accordance with one of a plurality of configurations as a function of user circuitry configuration data supplied thereto; and a receiver circuit coupled to said radiofrequency energy harvesting circuit and configured to receive a configuration data signal modulating said radiofrequency signal and extract the user circuitry configuration data from the configuration data signal received and supply the user circuitry configuration data to said user circuitry.

BRIEF DESCRIPTION OF THE DRAWINGS

One or more embodiments will now be described by way of example only, with reference to the annexed figures, wherein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. More-over, particular conformations, structures, or characteristics may be combined in any adequate way in one or more embodiments.

The references used herein are provided merely for convenience and hence do not define the extent of protection or the scope of the embodiments.

Figure 1:
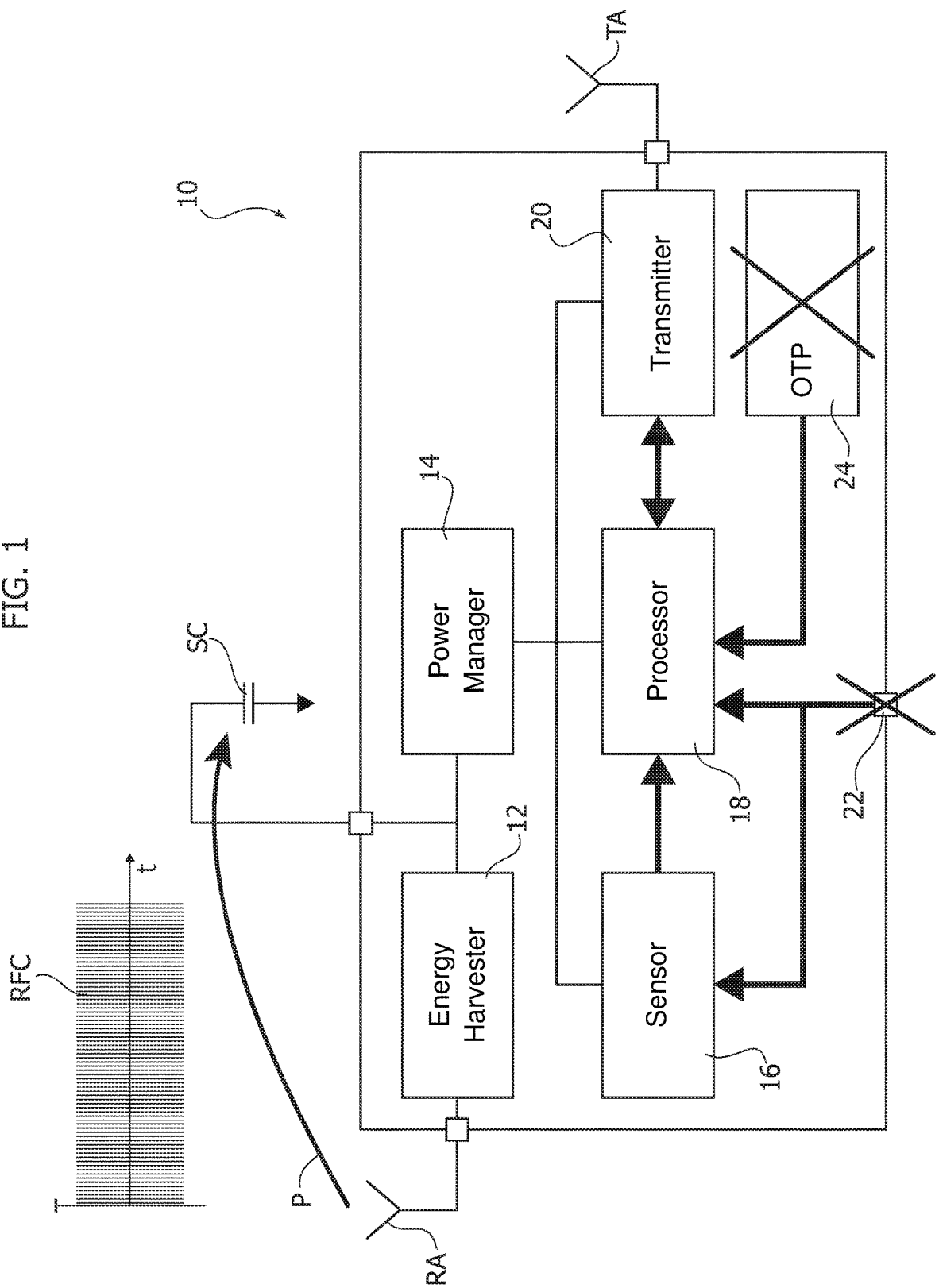
FIG. 1 is a block diagram exemplary of a conventional radiofrequency-powered device.

In FIG. 1, reference 10 denotes as a whole a radiofrequency (RF) powered device.

As noted, a wireless passive sensor node (WPSN) may be exemplary of such a device.

A device 10 as exemplified in FIG. 1 may comprise an energy-harvesting circuit 12 which may be configured (in a manner known to those of skill in the art) to act as an RF-to-DC converter, and is operational: to "harvest" energy carried by a radiofrequency signal (a radiofrequency carrier RFC, for instance) as captured by a receiver antenna RA, and to store the energy thus harvested onto a storage component such as a capacitor SC.

Energy stored on the storage capacitor SC may thus be used to supply—for instance, via an (ultra-low) power management circuit 14—various other "user" circuits in the device 10.

One or more sensor circuits 16, a processing unit (such as a microcontroller unit or MCU) 18 and a radio transmitter 20 configured to transmit via a transmitter antenna TA signals possibly corresponding to quantities sensed via the sensor circuits 16 may be exemplary of such circuits.

A conventional architecture for an RF-powered WPSN as exemplified in FIG. 1 may comprise additional features such as one or more general-purpose input/output modules (GPIOs) 22 and/or one or more one time programmable circuits (OTPs) 24 in order to provide use-case flexibility options.

As discussed previously, such an approach may give rise to certain drawbacks in terms of pin counting, package requirement and system miniaturization. For instance, the provision of OTPs such as 24 may have negative effects in terms of semiconductor area, circuit complexity and testing time.

Reducing the possible presence of GPIOs and/or OTPs (notionally, dispensing with them) thus represents a desirable goal to pursue.

Figure 2:
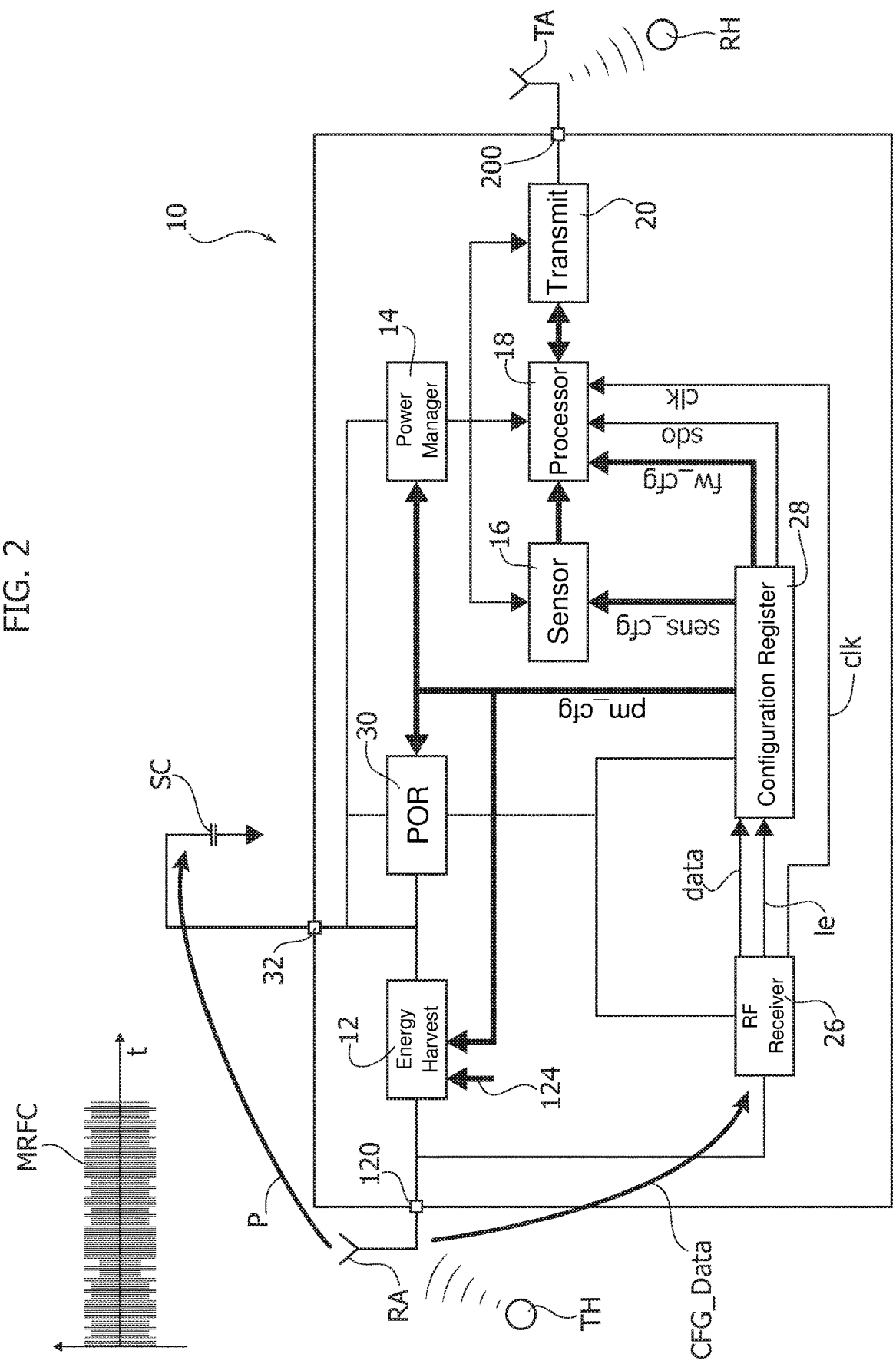
FIG. 2 is a block diagram exemplary of a radiofrequency-powered device according to embodiments as exemplified herein.

Such issues may be addressed in one or more embodiments as exemplified in FIG. 2.

In FIG. 2, parts or elements like parts or elements already discussed in connection with FIG. 1 are indicated with like reference symbols. A corresponding detailed description of these parts or elements will not be repeated here for brevity.

Also, it will be appreciated that the antennas RA, TA and the storage component (capacitor) SC may be distinct from the embodiments. Also, the sensor circuitry 16 may comprise sensors and/or interfaces towards sensors that may be distinct from the embodiments.

A device 10 as exemplified in FIG. 2 comprise an RF receiver circuit 26 coupled to the receiving antenna RA and configured to receive (and demodulate) a radiofrequency signal MRFC comprising a RF carrier (such as RFC in FIG. 1) modulated by a modulating signal CFG_Data conveying configuration data for the device 10.

Modulation of the signal MRFC via CFG_Data may be according to any known modulating scheme. Amplitude modulation (ASK, for instance, with CFG_Data being a binary modulating signal) may be an advantageous option for simplicity.

It will be appreciated that distinguishing between MRFC and CFG_Data is intended to highlight the fact that the circuit 26 extracts the information contents of the RF signal while the power contents of the RF signal is stored in the storage component SC.

For instance, the modulating signal CFG_Data may comprise a preamble followed by a "payload" containing configuration information.

Merely by way of example, the modulating signal CFG_Data may comprise a seven-bit preamble (such as 0110110, for instance) and, again by way of example, the configuration information may be arranged in groups of four bits, possibly followed by a parity bit for CRC check, for instance.

Those of skill in the art will appreciate that the examples given are merely illustrative and not imperative.

The signal CFG_Data as received at 26 can be demodulated and forwarded towards a configuration register 28 in the form of configuration data proper ("data") possibly supplemented with a latch enable signal 1e to be discussed in the following.

A clock signal clk may also be extracted from the signal CFG_Data to be used in clocking operation of the device 10 (by being forwarded to the processing unit 18, for instance).

In the diagram of FIG. 2, reference 30 denotes a power-on-reset (POR) circuit 30, which may be coupled with the receiver 26 and the register 28 as well as to a power node 32 configured to be coupled with the storage capacitor SC.

In the diagram of FIG. 2, reference numerals 120 and 200 indicate antenna nodes which facilitate coupling the circuit 10 with the receiver antenna RA and the transmitter antenna TA: as discussed previously, the antennas RA, TA and the storage component (capacitor) SC may be distinct elements with respect to the embodiments. Also, the sensor circuitry 16 may comprises sensors and/or interfaces towards sensors that may be distinct elements from the embodiments.

As exemplified in FIG. 2, the register 28 may be configured to derive from the configuration information ("data") received from the RF receiver 26:
  a power management configuration signal pm_cfg which is sent towards the circuits 12, 14 and 30;
  a sensor configuration signal sens_cfg which is sent towards the sensor circuitry 16
  a firmware configuration signal fw_cfg and a serial data (bitstream) output signal sdo which are sent towards the processing circuit 18.

For instance, the signal pm_cfg may comprise bits conveying information aimed at varying the configuration of the power-on-reset (POR) circuit 30 and/or the power management circuit 14 (voltage and/or current thresholds, and so on).

Still for instance, the signal sens_cfg may comprise sensor configuration bits (for instance, temperature, pressure, and so on, as a function of the sensors involved).

Also, in a programmable system, the signal fw_cfg may facilitate configuring such a system with firmware provided once for good and capable of performing different actions based on (static) input received from outside.

Finally, the signal sdo is indicative of the demodulated data obtained at the output of the register 28 in a serial manner, for instance, which facilitates transferring information towards the processing circuitry (MCU) 18, in a serial bitstream format, for instance.

Figure 3:
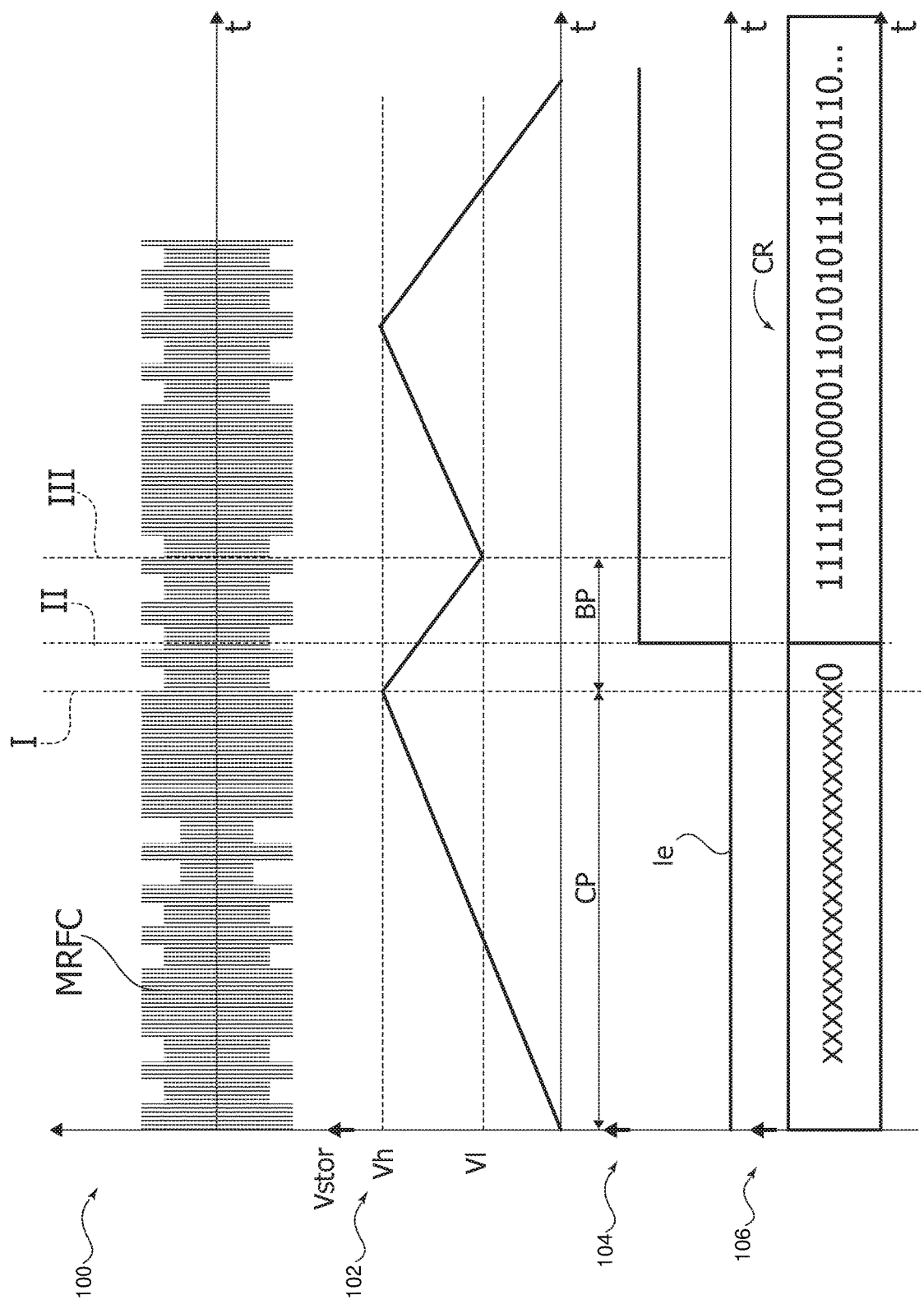
FIG. 3 shows timing diagrams which are exemplary of possible operation of embodiments.

In one or more embodiments, the circuit 10 can be configured to operate as exemplified in FIG. 3.

Such a mode of operation can be contemplated, for instance, within the framework of a wireless network, such as a wireless sensor network (WSN), including a transmitter TH acting as a network hub and configured to transmit a radiofrequency signal MRFC configured to be "harvested" by one or more RF-powered devices 10 such as wireless passive sensor nodes (WPSNs).

Aa discussed, the radiofrequency signal MRFC may be modulated with a configuration signal CFG_Data conveying configuration data for the RF-powered device or devices such as 10, with the possibility of providing different configuration data to different devices 10 if desired (via different encoded signals, for instance).

The device or devices 10 may then transmit via the transmitter 20 towards a receiver RH respective RF signals possibly corresponding to quantities sensed via the sensor circuits 16. While exemplified as a separate entity for simplicity, the receiver RH may in fact coincide with the transmitter TH. Similarly, while exemplified as separate entities for simplicity, the antennas RA and TA may be incorporated to a single entity.

FIG. 3 comprises four timing diagrams, designated 100, 102, 104 and 106. These four diagrams are exemplary of possible time behaviors referred to a common time scale (abscissa scale) for:
  the radiofrequency modulated carrier signal MRFC (diagram designated 100),
  the voltage Vstor (and thus energy) stored on the storage capacitor SC (diagram designated 102),
  a latch enable signal 1e sent from the RF receiver 26 to the configuration register 28 (diagram designated 104), and
  the configuration information carried by CFG_Data as demodulated at the receiver 26 and sent as "data" towards the configuration register 28 (diagram designated 106).

The left-hand portion of FIG. 3 is exemplary of a charge phase CP during which energy as captured by the antenna RA is harvested by the RF-to-DC circuit 12 and gradually stored onto the storage capacitor SC until the voltage Vstor across SC reaches an (upper) threshold value Vh.

At that point (as indicated by the vertical line designated I in FIG. 3), the RF receiver 26 is turned on (and the configuration register 28 reset).

At that point, energy scavenged from the storage capacitor SC starts energizing the receiver 26 and, as a consequence, the voltage Vstor at the capacitor SC starts decreasing in a burst phase BP.

During that phase (following enablement by the latch enable signal 1e as indicated by the vertical line designated II, which may result from the preamble in CFG_Data having been recognized and found to be completed) the "payload" carried by CFG_Data (that is the configuration information as discussed previously) can be extracted at the register 28 to facilitate issue of the signals pm_cfg, sens_cfg, fw_cfg, sdo and distributed within the device 10 as discussed previously.

Operation of the sensor circuitry 16, the processing unit (MCU) 18, the radio transmitter 20 may thus ensue as desired under the coordination of the power management circuit 14, while the RF energy harvesting action may be continued, for instant as an alternation of charging phases (capacitor SC charged from a "low" voltage Vl to the "high" voltage Vh) and discharging phase (capacitor SC discharged from the "high" voltage Vh due to energy being sunk therefrom).

In one or more embodiments as exemplified in FIG. 3 an "Over-the-Air" configuration operation as discussed previously may take the form of a one-time act after which the capacitor SC may be discharged below the voltage Vl as shown at the vertical line designated with III and the device 10 is (configured) brought to a quiescence mode and configured to be "woken-up" again via the power-on-reset circuitry 30.

One or more embodiments as exemplified in FIGS. 2 and 3 may provide notable advantages over conventional arrangements as exemplified in FIG. 1 in terms of reduced power consumption, improved speed, reduced consumption and cost savings.

Additional operation flexibility may be achieved thanks to the possibility of introducing options and functional features with a low-cost architectures by also contributing to improved miniaturization performance possibly related to a reduced use of GPIOs, which may be possibly dispensed with, the same also applying to OTPs.

This latter point deserved to be judged against power consumption issues in cold start as may arise for energy harvesting applications.

FIG. 2 also illustrates the possible provision of dedicated terminal 124 in the RF-to-DC transducer 12 for measuring an open circuit voltage, which may be advantageous for a variety of applications.

A device (for instance, 10) as exemplified herein may comprise:
  a radiofrequency energy harvesting circuit (for instance, 12) configured (for instance, via the node 120) to be coupled to an antenna (for instance, RA) to harvest radiofrequency energy captured by said antenna from a radiofrequency signal (for instance, MRFC), the radiofrequency energy harvesting circuit configured (for instance, via the node 32) to be coupled to an energy storage component (for instance, SC) to store therein energy harvested via the radiofrequency energy harvesting circuit,
  user circuitry (for instance, 16, 18, 20) configured to be supplied with energy harvested via the radiofrequency energy harvesting circuit (as possibly stored on an energy storage component such as SC) and to operate in accordance with one of a plurality of configurations as a function of configuration data (for instance, sens_cfg, fw_cfg, sdo) supplied thereto,
  a receiver circuit (for instance, 26) coupled to said radiofrequency energy harvesting circuit and configured to receive a configuration data signal (for instance, CFG_Data) modulating said radiofrequency signal and supply to the user circuitry (16, 18, 20) configuration data extracted from the configuration data signal received.

A device as exemplified herein may comprise power management circuitry (for instance, 12, 30) coupled to the energy harvesting circuit and to the receiver circuit, the power management circuitry configured to:
  activate (see, for instance, the phase CP) the energy harvesting circuit to initiate storing in said energy storage component energy harvested via the radiofrequency energy harvesting circuit, and
  activate (for instance, via the latch enable signal 1e), following initiation of storing in said energy storage component energy harvested via the radiofrequency energy harvesting circuit, the receiver circuit to extract from the configuration data signal received said configuration data for the user circuitry.

In a device as exemplified herein the user circuitry may comprise circuitry selected out of:
  sensor circuitry (for instance, sensors and/or interfaces for external sensors 16),
  signal processing circuitry (for instance, a MCU 18), a radiofrequency transmitter (for instance, 20) configured (for instance, via the node 200) to be coupled to a respective antenna (for instance, TA).

A device as exemplified herein may also comprise at least one of said antenna and said energy storage component coupled to said radiofrequency energy harvesting circuit.

A system as exemplified herein may comprise:
at least one device as exemplified herein,
a radio frequency transmitter (for instance, TH) configured to transmit to said at least one device said radiofrequency signal modulated with said configuration data signal.

In a system as exemplified herein said configuration data signal (for instance, CFG_Data) may comprise a preamble and payload data conveying said configuration data for the user circuitry.

In a system as exemplified herein, said configuration data signal may comprises at least one of:
a clock signal (for instance, clk) to clock operation of said user circuitry, and/or
a latch enable signal (for instance, le) to enable extraction (for instance, CR) of said configuration data from the configuration data signal received.

A method of operating a device or a system as exemplified herein may comprise:
activating said radiofrequency energy harvesting circuit, wherein said radiofrequency energy harvesting circuit harvests radiofrequency energy captured by said antenna and stores in said energy storage component energy harvested via the radiofrequency energy harvesting circuit,
activating said receiver circuit to receive said configuration data signal modulating said radiofrequency signal and supply to the user circuitry configuration data extracted from the configuration data signal received, and
configuring said user circuitry to operate in accordance with one of a plurality of configurations as a function of configuration data supplied thereto.

Without prejudice to the underlying principles, the details and embodiments may vary, even significantly, with respect to what has been described by way of example only without departing from the scope of protection.

The extent of protection is defined by the annexed claims. The claims are an integral part of the technical disclosure of embodiments as provided herein.

The invention claimed is:

1. A device, comprising:
a radiofrequency energy harvesting circuit configured to harvest radiofrequency energy from a radiofrequency signal and store the harvested radiofrequency energy in an energy storage component;
user circuitry configured to be supplied with energy from said energy storage component and to operate in accordance with one of a plurality of configurations as a function of received user circuitry configuration data; and
a receiver circuit coupled to said radiofrequency energy harvesting circuit and configured to receive a configuration data signal modulating said radiofrequency signal and extract the user circuitry configuration data from the configuration data signal received and supply the user circuitry configuration data to said user circuitry;
wherein said configuration data signal comprises a preamble and payload data conveying said user circuitry configuration data.

2. The device of claim 1, further comprising a power management circuit coupled to the energy harvesting circuit and to the receiver circuit, the power management circuitry configured to:
activate the energy harvesting circuit to initiate storing of the harvested radiofrequency energy in said energy storage component; and
activate, following initiation of storing of the harvested radiofrequency energy in said energy storage component, the receiver circuit to extract the user circuitry configuration data from the configuration data signal.

3. The device of claim 2, wherein the user circuitry configuration data is further provided to the power management circuit in order to vary voltage thresholds of the power management circuit.

4. The device of claim 2, wherein the user circuitry configuration data is further provided to the power management circuit in order to vary current thresholds of the power management circuit.

5. The device of claim 1, further comprising a power on reset (POR) circuit coupled to the receiver circuit and wherein the user circuitry configuration data is further provided to the POR circuit in order to configure operation of the POR circuit.

6. The device of claim 1, wherein the user circuitry comprises a sensor circuit and the user circuitry configuration data supplied to the sensor circuit comprises configuration bits for configuring operation of the sensor circuit.

7. The device of claim 6, wherein the configuration bits set temperature sensing performed by the sensor circuit.

8. The device of claim 6, wherein the configuration bits set pressure sensing performed by the sensor circuit.

9. The device of claim 1, wherein the user circuitry comprises a signal processing circuit and the user circuitry configuration data supplied to the signal processing circuit comprises firmware bits for configuring operation of the signal processing circuit.

10. The device of claim 1, further comprising a connection to an antenna and a connection to said energy storage component coupled to said radiofrequency energy harvesting circuit.

11. The device of claim 1, wherein said configuration data signal comprises at least one of:
a clock signal to clock operation of said user circuitry, and
a latch enable signal to enable extraction of said user circuitry configuration data from the configuration data signal.

12. The device of claim 1, wherein the radiofrequency signal modulated with said configuration data signal is generated by a radio frequency transmitter.

13. A device, comprising:
a radiofrequency (RF) energy harvesting circuit configured to harvest RF energy from a radiofrequency signal and store the harvested RF energy in an energy storage component;
an RF receiver configured to receive the radiofrequency signal, wherein the radiofrequency signal is modulated by a configuration data signal, and to extract configuration data from the configuration data signal;
a configuration register that stores the configuration data and outputs the configuration data for controlling operational configuration of:
a processing circuit, wherein the configuration data comprises firmware bits for configuring operation of the processing circuit;
a sensor circuit having a sensing operation controlled by the configuration data; and a power management circuit that receives energy from the energy storage component and supplies power to the processing circuit and sensor circuit in response to the configuration data.

14. The device of claim 13, wherein the firmware bits of the configuration data are provided as static bits output from the configuration register.

15. The device of claim 13, wherein the firmware bits of the configuration data are provided as a serial bit stream output from the configuration register.

16. The device of claim 13, wherein the power management circuit is configured to:
    activate the energy harvesting circuit to initiate storing of the harvested radiofrequency energy in said energy storage component; and
    subsequently activate the RF receiver to extract the user circuitry configuration data from the configuration data signal.

17. The device of claim 13, wherein the RF receiver is further configured to generate a clock signal applied to the processing circuit in response to receipt of the radiofrequency signal that is modulated by the configuration data signal.

18. The device of claim 13, wherein the RF receiver is further configured to generate an enable signal applied to the configuration register, wherein the configuration register operates to latch the configuration data from the RF receiver in response to the enable signal.

19. The device of claim 13, further comprising a power on reset (POR) circuit coupled to the RF receiver and wherein the configuration data is further provided to the POR circuit from the configuration register in order to configure operation of the POR circuit.

20. A device, comprising:
    a radiofrequency energy harvesting circuit configured to harvest radiofrequency energy from a radiofrequency signal and store the harvested radiofrequency energy in an energy storage component;
    processing circuitry powered from said energy storage component, said processing circuitry configured to perform actions in response to firmware; and
    a receiver circuit powered from said energy storage component and coupled to said radiofrequency energy harvesting circuit, said receiver circuit configured to receive a configuration data signal modulating said radiofrequency signal and extract circuit configuration data from the configuration data signal for application to program the firmware of the processing circuitry.

21. The device of claim 20, further comprising a configuration register powered from said energy storage component, said configuration register storing the circuit configuration data and outputting the circuit configuration data to said processing circuitry.

22. The device of claim 21, wherein the circuit configuration data comprises static firmware bits output from the configuration register.

23. The device of claim 21, wherein the circuit configuration data comprises firmware bits provided as a serial bit stream output from the configuration register.

24. The device of claim 20, further comprising a connection to an antenna and a connection to said energy storage component coupled to said radiofrequency energy harvesting circuit.

25. A device, comprising:
    a radiofrequency energy harvesting circuit configured to harvest radiofrequency energy from a radiofrequency signal and store the harvested radiofrequency energy in an energy storage component;
    a power management circuit coupled to said energy storage component;
    processing circuitry powered through said power management circuit from said energy storage component; and
    a receiver circuit powered from said energy storage component and coupled to said radiofrequency energy harvesting circuit, said receiver circuit configured to receive a configuration data signal modulating said radiofrequency signal and extract circuit configuration data from the configuration data signal for application to control power management settings of the power management circuit.

26. The device of claim 25, further comprising a configuration register powered from said energy storage component, said configuration register storing the circuit configuration data and outputting the circuit configuration data to said power management circuit.

27. The device of claim 26, further comprising a power on reset circuit powered from said energy storage component and configured to supply power to said configuration register, wherein the circuit configuration data extracted by said receiver circuit from the configuration data signal is further applied to control power management settings of the power on reset circuit.

28. The device of claim 25, further comprising a power on reset circuit powered from said energy storage component and configured to supply power to said receiver circuit, wherein the circuit configuration data extracted by said receiver circuit from the configuration data signal is further applied to control power management settings of the power on reset circuit.

29. The device of claim 25, wherein the circuit configuration data extracted by said receiver circuit from the configuration data signal is further applied to control operation of the radiofrequency energy harvesting circuit.

30. A device, comprising:
    a radiofrequency energy harvesting circuit configured to harvest radiofrequency energy from a radiofrequency signal and store the harvested radiofrequency energy in an energy storage component;
    user circuitry configured to be supplied with energy from said energy storage component and to operate in accordance with one of a plurality of configurations as a function of received user circuitry configuration data; and
    a receiver circuit coupled to said radiofrequency energy harvesting circuit and configured to receive a configuration data signal modulating said radiofrequency signal and extract the user circuitry configuration data from the configuration data signal received and supply the user circuitry configuration data to said user circuitry;
    wherein said configuration data signal comprises at least one of:
        a clock signal to clock operation of said user circuitry, and
        a latch enable signal to enable extraction of said user circuitry configuration data from the configuration data signal.

31. The device of claim 30, further comprising a power management circuit coupled to the energy harvesting circuit and to the receiver circuit, the power management circuitry configured to:

activate the energy harvesting circuit to initiate storing of the harvested radiofrequency energy in said energy storage component; and activate, following initiation of storing of the harvested radiofrequency energy in said energy storage component, the receiver circuit to extract the user circuitry configuration data from the configuration data signal.

32. The device of claim 31, wherein the user circuitry configuration data is further provided to the power management circuit in order to vary voltage thresholds of the power management circuit.

33. The device of claim 31, wherein the user circuitry configuration data is further provided to the power management circuit in order to vary current thresholds of the power management circuit.

34. The device of claim 30, further comprising a power on reset (POR) circuit coupled to the receiver circuit and wherein the user circuitry configuration data is further provided to the POR circuit in order to configure operation of the POR circuit.

35. The device of claim 30, wherein the user circuitry comprises a sensor circuit and the user circuitry configuration data supplied to the sensor circuit comprises configuration bits for configuring operation of the sensor circuit.

36. The device of claim 35, wherein the configuration bits set temperature sensing performed by the sensor circuit.

37. The device of claim 35, wherein the configuration bits set pressure sensing performed by the sensor circuit.

38. The device of claim 30, wherein the user circuitry comprises a signal processing circuit and the user circuitry configuration data supplied to the signal processing circuit comprises firmware bits for configuring operation of the signal processing circuit.

39. The device of claim 30, further comprising a connection to an antenna and a connection to said energy storage component coupled to said radiofrequency energy harvesting circuit.

40. The device of claim 30, wherein the radiofrequency signal modulated with said configuration data signal is generated by a radio frequency transmitter.

\* \* \* \* \*